US012155138B2

(12) United States Patent
Qin et al.

(10) Patent No.: US 12,155,138 B2
(45) Date of Patent: Nov. 26, 2024

(54) CARD EDGE CONNECTOR WITH IMPROVED TERMINAL PATTERN

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Teng Qin, Kunshan (CN); Wen-Jun Tang, Kunshan (CN); Xue-Wu Bu, Kunshan (CN); Ming-Liu Xu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 352 days.

(21) Appl. No.: 17/806,712

(22) Filed: Jun. 13, 2022

(65) Prior Publication Data

US 2022/0399664 A1 Dec. 15, 2022

(30) Foreign Application Priority Data

Jun. 11, 2021 (CN) ......................... 202110653346.1

(51) Int. Cl.
*H01R 12/73* (2011.01)
*H01R 12/55* (2011.01)
(Continued)

(52) U.S. Cl.
CPC ........... *H01R 12/732* (2013.01); *H01R 12/55* (2013.01); *H01R 12/727* (2013.01); *H01R 13/41* (2013.01)

(58) Field of Classification Search
CPC ........ H01R 12/51; H01R 12/55; H01R 12/57; H01R 12/71; H01R 12/72; H01R 12/721;
(Continued)

(56) References Cited

U.S. PATENT DOCUMENTS 7,371,117 B2 5/2008 Gailus
9,768,557 B2 9/2017 Phillips et al.
(Continued)

FOREIGN PATENT DOCUMENTS

CN 112886340 A 6/2021

*Primary Examiner* — Khiem M Nguyen
(74) *Attorney, Agent, or Firm* — Ming Chieh Chang

(57) ABSTRACT

A card edge connector includes: an insulating housing including two opposite side walls, a card slot defined between the two side walls and opening forward, and plural passageways on the side wall; a row of terminals received in corresponding passageways respectively and categorized with first terminals and second terminals, two adjacent first terminals being paired to be a pair of differential terminals and the second terminals being non-differential terminals, each of the row of terminals including a retaining portion, an elastic portion extending forward and a leg portion extending rearward from the elastic portion; and plural insulators retained in the insulating housing, wherein the first terminal and the second terminal are similarly shaped, each pair of differential terminals is retained in the insulator, and each of the second terminals is directly retained in the passageway.

11 Claims, 12 Drawing Sheets

(51) Int. Cl.
*H01R 12/72* (2011.01)
*H01R 13/41* (2006.01)

(58) Field of Classification Search
CPC .. H01R 12/722; H01R 12/725; H01R 12/727; H01R 12/73; H01R 12/732; H01R 13/40; H01R 13/405; H01R 13/41
USPC .................................................. 439/625, 634
See application file for complete search history.

(56) References Cited

U.S. PATENT DOCUMENTS

| | | | | |
|---|---|---|---|---|
| 10,439,311 | B2 | 10/2019 | Phillips et al. | |
| 10,777,921 | B2 | 9/2020 | Lu et al. | |
| 2020/0076131 | A1 | 3/2020 | Hu et al. | |
| 2020/0350717 | A1* | 11/2020 | Dong | H01R 13/112 |
| 2021/0126402 | A1 | 4/2021 | Zhang et al. | |
| 2022/0399664 | A1* | 12/2022 | Qin | H01R 12/721 |

* cited by examiner

CARD EDGE CONNECTOR WITH IMPROVED TERMINAL PATTERN

BACKGROUND OF THE INVENTION

1. Field of the Invention

The present invention relates to a card edge connector.

2. Description of Related Arts

China Utility Model No. 208797211 discloses a card edge connector, which includes a longitudinal housing, two terminal modules, and two grounding bars attached to the terminal modules respectively. The housing defines two side walls and a card slot between the side walls. The terminal module includes an insulator and a row of terminals embedded in the insulator. The grounding bar is attached to the insulator and contacts grounding terminals in the row of the terminals. A fitting engagement between the insulator and the housing may become loose due to the grounding bar.

Therefore, an improved card edge connector is desired to overcome the disadvantages of the prior art.

SUMMARY OF THE INVENTION

An object of the present invention is to provide a card edge connector with an improved high transmission performance.

In order to achieve above-mentioned object, a card edge connector comprises: an insulating housing comprising two opposite side walls, a card slot defined between the two side walls and opening forward, and a plurality of passageways on the side wall; a row of terminals received in corresponding passageways respectively and categorized with first terminals and second terminals, two adjacent first terminals being paired to be a pair of differential terminals and the second terminals being non-differential terminals, each of the row of terminals comprising a retaining portion, an elastic portion extending forward and a leg portion extending rearward from the elastic portion; and a plurality of insulators retained in the insulating housing, wherein the first terminal and the second terminal are similarly shaped, each pair of differential terminals is retained in the insulator, and each of the second terminals is directly retained in the passageway.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
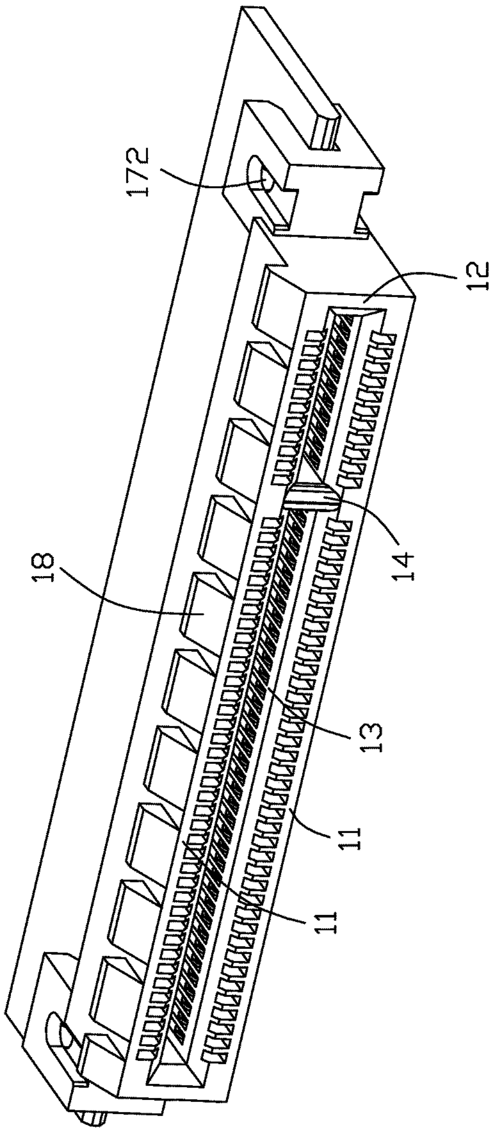
FIG. 1 is a perspective view of a card edge connector mounted in a mother board in accordance with an embodiment of the present invention.
Figure 2:
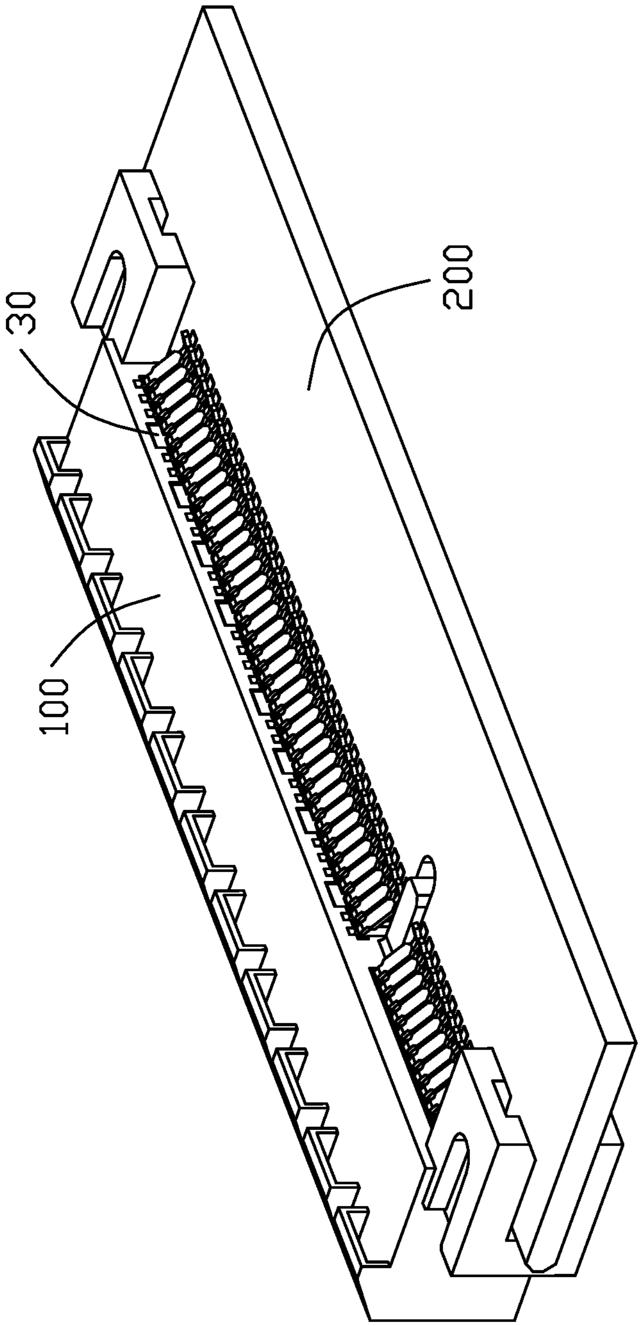
FIG. 2 is another perspective view of the card edge connector and the mother board in FIG. 1.
Figure 3:
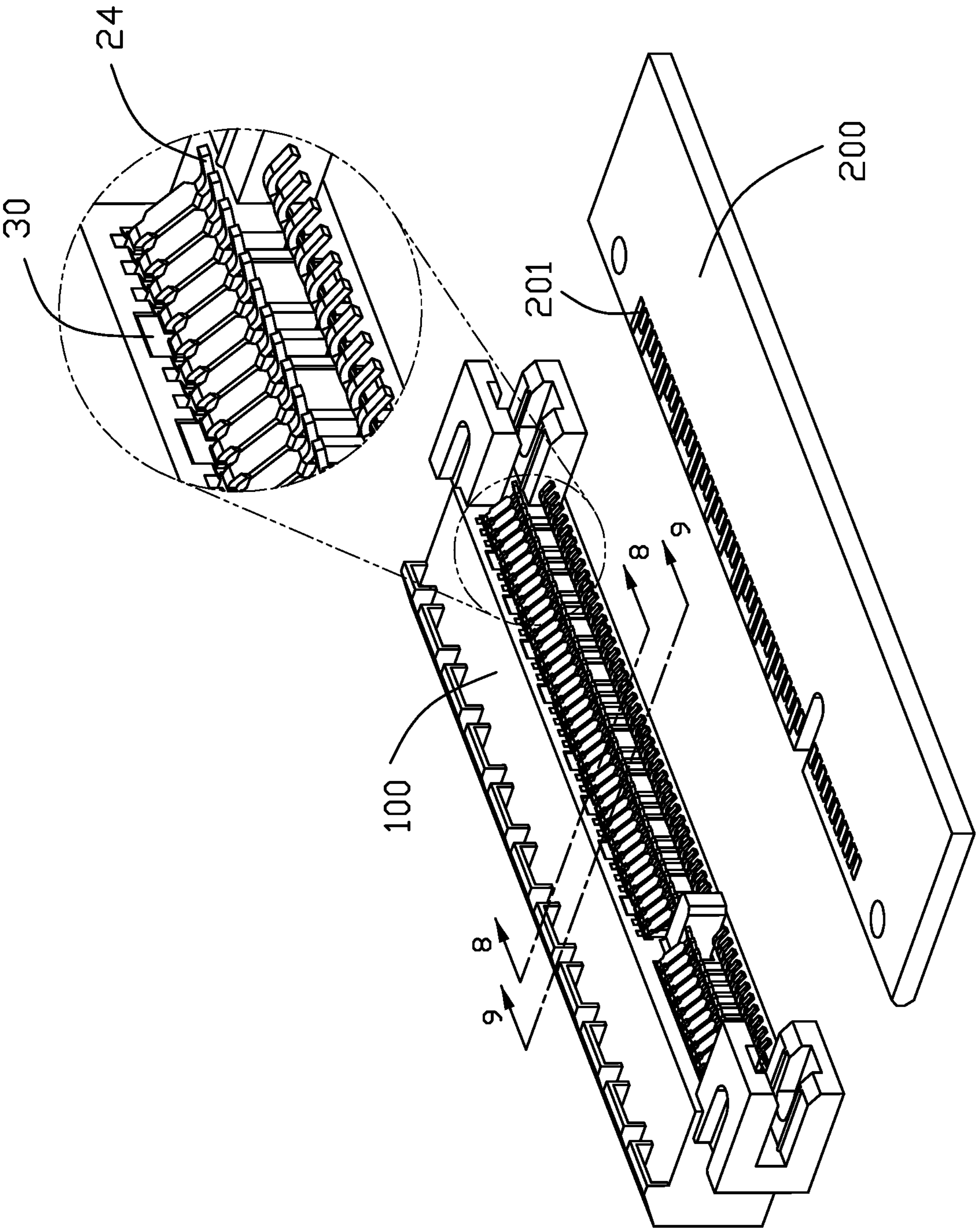
FIG. 3 is an exploded perspective view of the card edge connector and the mother board in FIG. 2.
Figure 4:
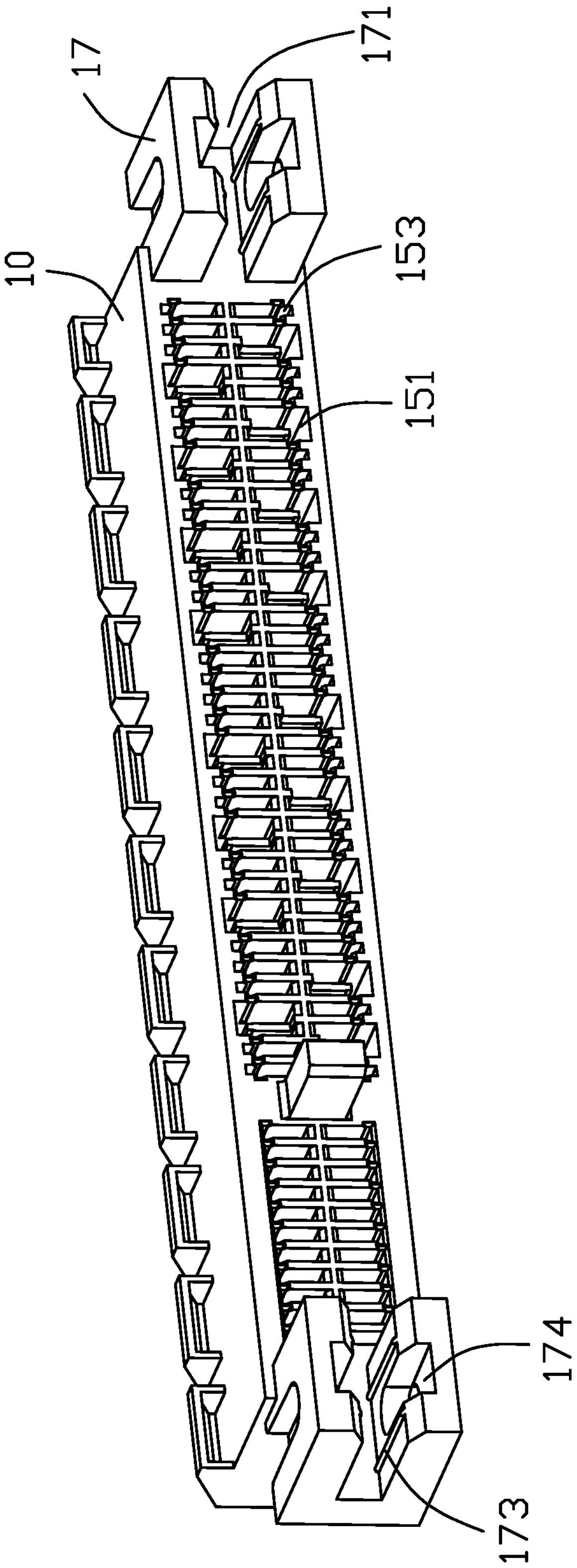
FIG. 4 is a perspective view of a housing of the card edge connector in FIG. 3.
Figure 5:
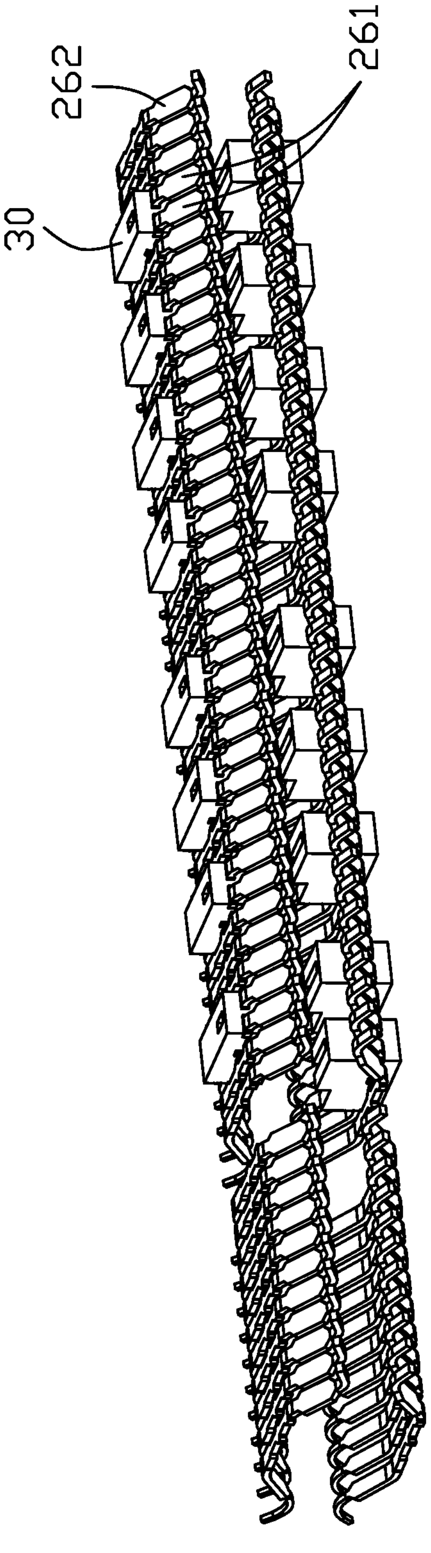
FIG. 5 is a perspective view of the terminals of the card edge connector in FIG. 3.
Figure 6:
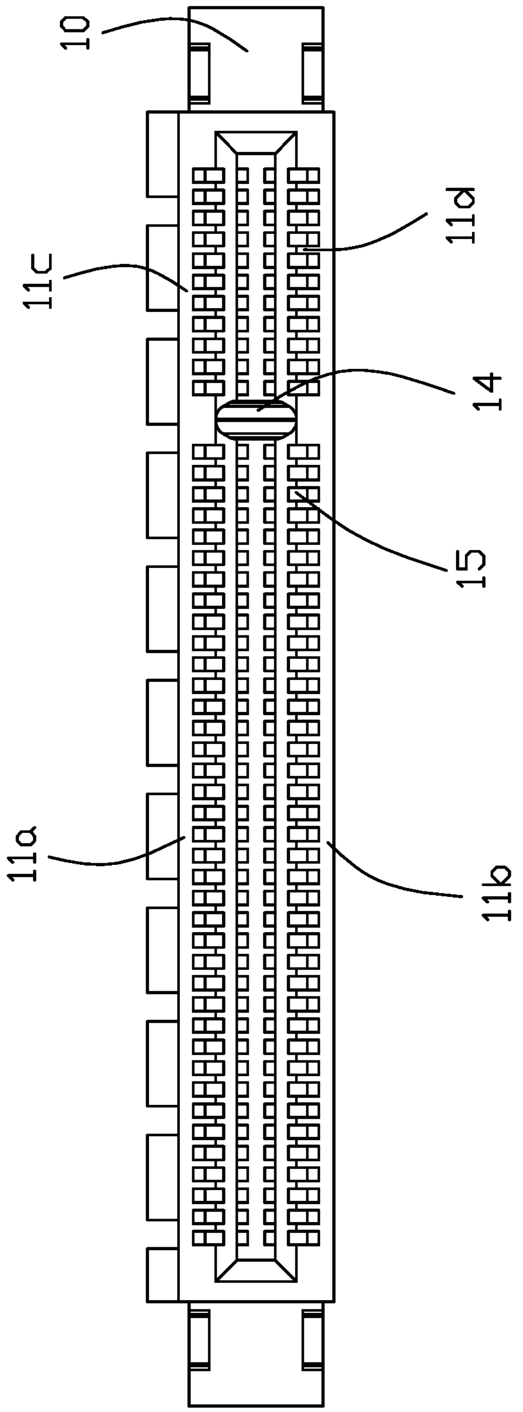
FIG. 6 is a rear plane view of the housing in FIG. 4.
Figure 7:
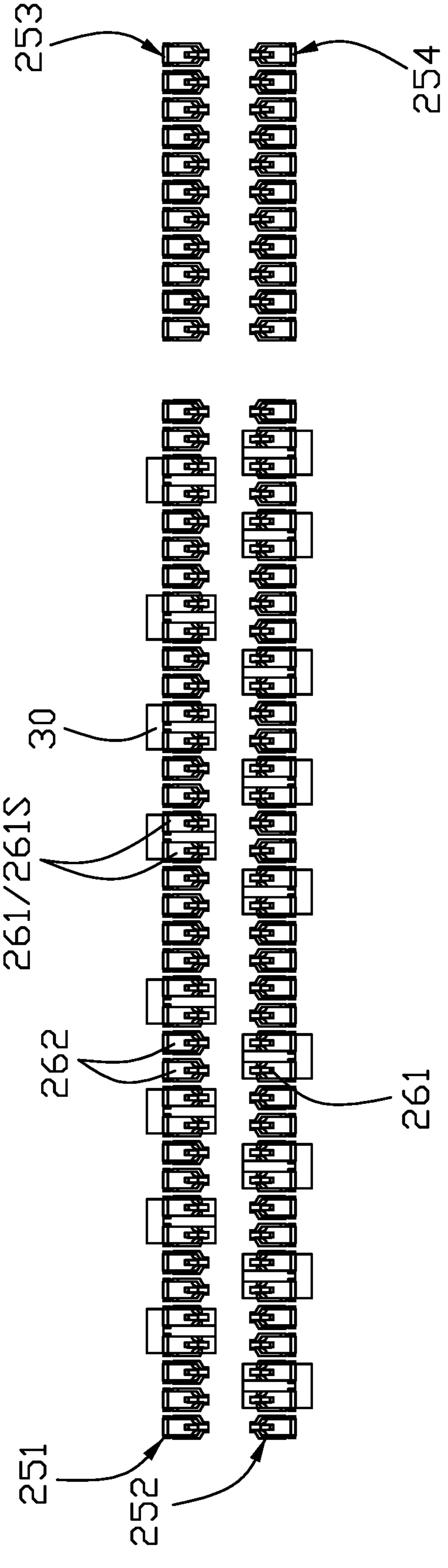
FIG. 7 is a rear plane view of the terminals in FIG. 5.
Figure 8:
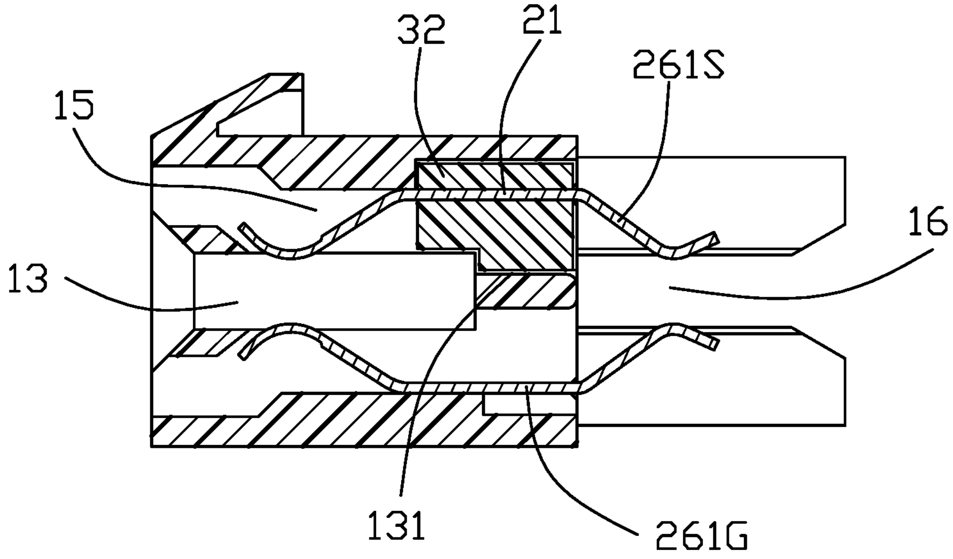
FIG. 8 is a cross sectional view of the card edge connector in FIG. 3 taken along lines 8-8.
Figure 9:
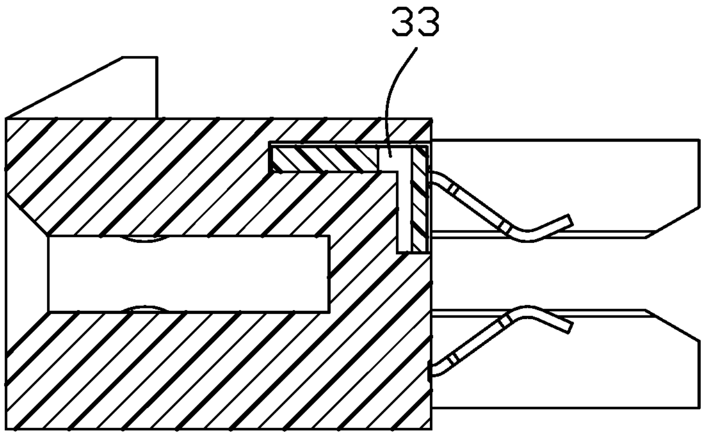
FIG. 9 is a cross sectional view of the card edge connector in FIG. 3 taken along lines 9-9.
Figure 10:
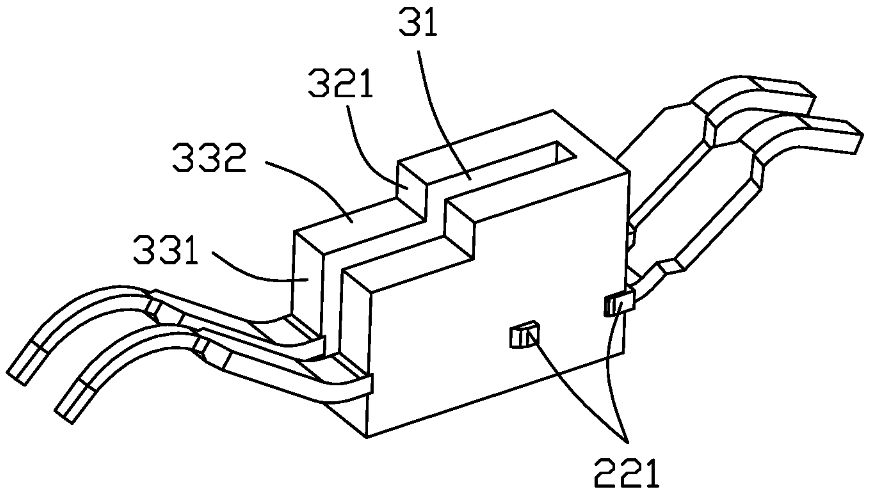
FIG. 10 is a perspective view of a terminal module of the card edge connector in FIG. 3.
Figure 11:
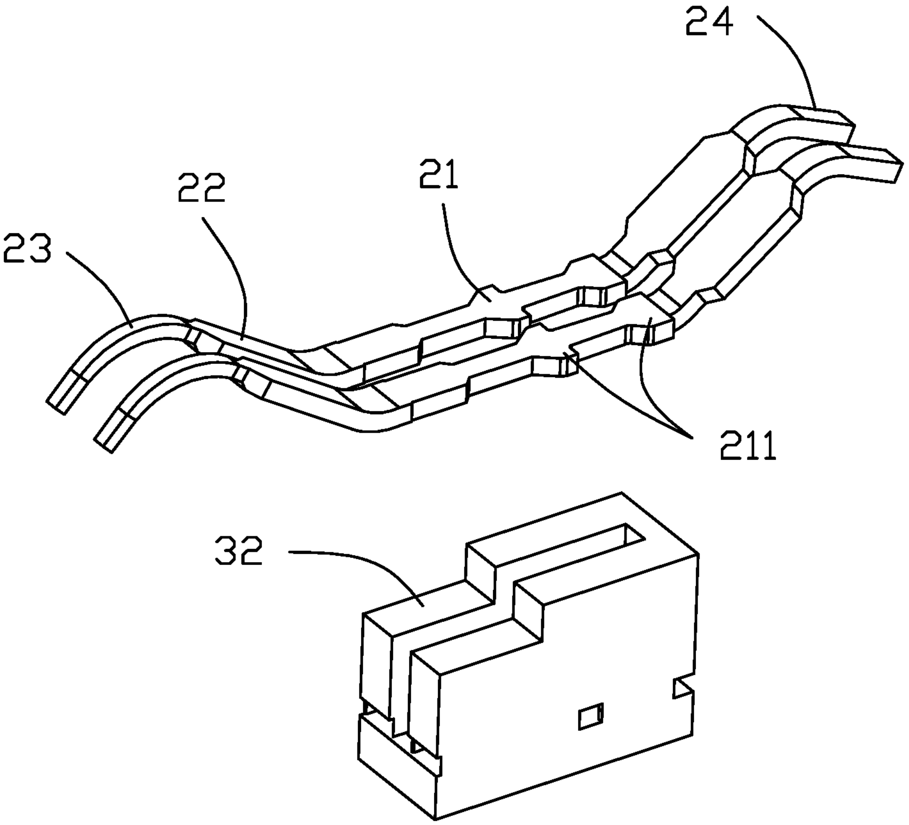
FIG. 11 is an exploded perspective view of the terminal module in FIG. 10.
Figure 12:
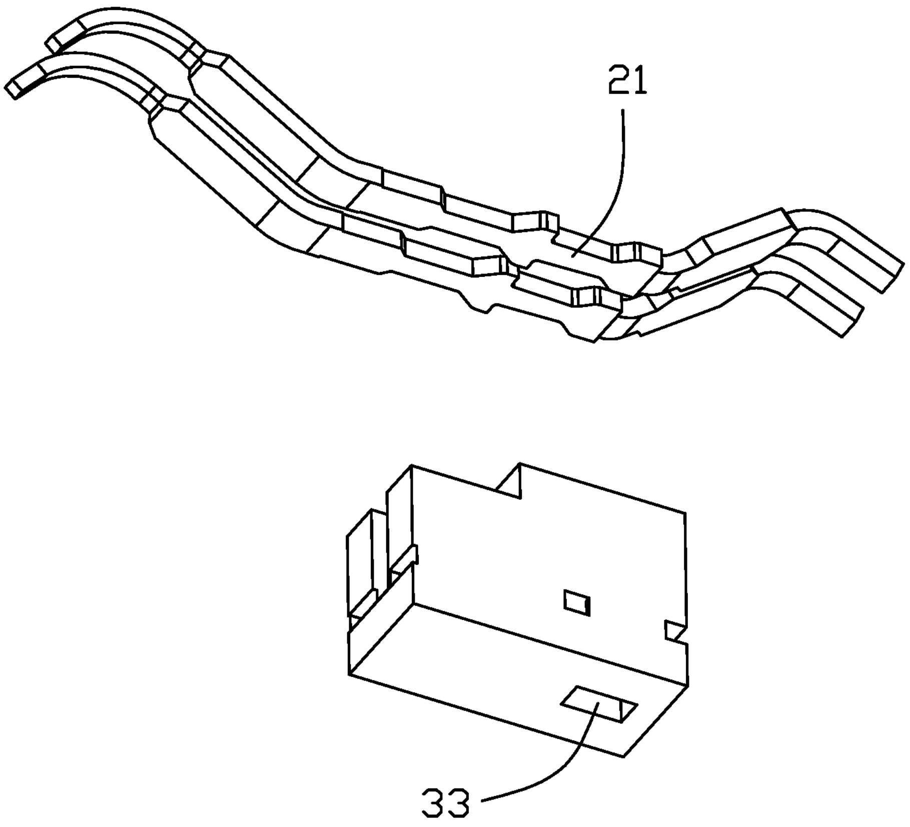
FIG. 12 is another exploded perspective view of the differential terminal module in FIG. 11.

Referring to FIGS. 1-12 illustrating a card edge connector 100 which can receive a PCI Express 6.0 module or other modules, the card edge connector 100 is mounted on a circuit board, e.g., a mother board 200, and defines a card slot 13 at a front side to be inserted with the PCI Express module. In this embodiment, the card edge connector 100 claps opposite sides of an edge of the mother board 200. The front side of the housing is defined as a mating side in this embodiment to confront the module in a mating direction.

The card edge connector 100 includes a longitudinal housing 10 made from insulating material and a plurality of terminals 20. The housing 10 includes two side walls 11 and two end walls 12 connecting with opposite ends of the two side walls 11, and the card slot 13 is commonly defined among the side walls and the end walls. A key 14 is disposed in the card slot 13 and unitarily joints with the two side walls 11. Therefore, the two side walls 2 are divided to four sub-walls 11*a*, 11*b*, 11*c*, 11*d*. Each sub-wall is arranged with one row of the terminals. Each terminal 20 includes a retaining portion 21, an elastic portion 22 extending slantwise and forwards from the retaining portion 21 with a contacting portion 23 and a leg portion 24 extending rearwards from the retaining portion 21. As clearly shown, the retaining portion 21 is wider than the elastic portion 22 along a longitudinal direction. The retaining portion 21 defines barbs 211 at opposite sides thereof. The contacting portion 23 has a smallest width of the wholly terminals. The leg portions 24 are slant and elastic, similar to the elastic portions for provide deformation.

The one sub-wall 11*a* is loaded with a first row 251 of the terminals, the terminals of the first row are identical in structure. The first row of terminals are categorized with plural first terminals 261 and plural second terminals 262, and adjacent two first terminals are paired to be a pair of differential terminals 261S to transmit differential signal. The second terminals 262 can be grounding terminals, power terminals or controlling signal terminals, for transmitting non-differential signal. The pairs of differential terminals 261S is alternatively arranged with the second terminals 262. The side walls 11 define passageways 15 to receive the first and second terminals one by one. An improved feature of this card edge connector 100 is that, each pair of differential terminals 261S is retained in an insulator 30 and then inserted into the passage ways 15. The retaining portions 21 of each pair of the differential terminals 261S are embedded in the insulator 30. Each second terminal 262 are directly inserted into the passageway 15, the retaining portions 21 are directly retained with the passageways 15. In this embodiment, two passageways 15 receiving the pair of differential terminals partially communicate with each other and configured as a receiving space 151, the receiving space 15 is located approximate to a rear end of the housing 10 and receives the insulator 30. Each insulator 30 retains each pair of differential terminals by injecting mold process, the retaining portions 21 are embedded in the insulators 30 and the elastic portions 22 are located in front of the insulators 30 and the leg portions 24 are located behind the insulator 30. The barbs 211 of the second terminals 262 are interfered with the retaining passageways 153. The first and second terminals of the first row of terminals 261 have same construction and are configured from a same metal strip. The first terminals 261 are of a module type, the second terminals 262 are of an inserting type. The patterns of the first and second terminal effectively improve impedance reduce crosstalk of the card edge connector 100. The insulators 30 are selectively made from conventional LCP material, the improvement of decrease crosstalk and resonance is obviously than conventional metal grounding bar or conductive plastic Each insulator 30 defines an opening slot 31 opening through a first/front face 331 through which the elastic portion 22 protrudes and a second/inner face 332 to expose one face of the retaining portion 21 to an exterior of the insulator 30. The opening slot 31 is located between the two first terminals 261. A front portion 32 of the insulator is lower than a rear portion of the insulator, thereby defining a step face 321. After the insulator 30 is received in the receiving space 151, the step face 321 runs through an inner bottom face 131 of the card slot 13 and abuts against the housing to limit the insulator forward movement. The insulator 30 further defines a through hole 33 extending through in the first face 331 and the second face 332.

The one sub wall **11*b* is loaded with a second row 252 of the terminals. The first row and the second row of terminals are disposed at opposite sides of the card slot 13. The second row of terminals has a same construct and a same pattern with the first row of terminals. The second row of terminals comprising first terminals 261 and second terminals 262, while the first terminals of the first row of the terminals are offset with the first terminals of the second row of the terminals. In the first row of the terminals or the second row of the terminals, the second terminals 262 includes grounding terminals 262G, one grounding terminal is arranged between adjacent pairs of the differential terminals 261**S.

The one sub wall **11*c* is loaded with a third row 253 of the terminals. The one sub wall 11*d* is loaded with a fourth row 254 of the terminals. The third row is located at a side of the first row along the longitudinal direction, and the fourth row is located at a side of the second row along the longitudinal direction. The third row and the fourth row of the terminals are located at opposite sides of the card slot 13 along the transverse direction and all the third and the fourth rows of the terminals are the second terminals 262**.

A board receiving space 16 is formed between the leg portions 24 of said rows of the terminals to receive the mother board 200. The leg portions are electrically and mechanically connected with metal fingers 201 on the mother board 200. A pair of clipping portions 17 extends rearward from opposite sides of the housing 10. The clipping portion 17 defines a clipping slot 171 therethrough in the longitudinal direction to be a part of the board receiving space 16. The clipping portion defines a retaining hole 172 therethrough in the transverse direction and two ribs 173 extending along the mating direction. The mother board will is firstly retained and positioned in the clipping slot 171 by the ribs 173. A recess 174 is defined in an inner face of the clipping portion 17 and opening rearward to receive a nut. A row of protrusion 18 is defined on one side walk 11.

However, the disclosure is illustrative only, changes may be made in detail, especially in matter of shape, size, and arrangement of parts within the principles of the invention.

What is claimed is:

1. A card edge connector comprising:

an insulating housing comprising two opposite side walls, a card slot defined between the two side walls and opening forward, and a plurality of passageways on the side wall;

a row of terminals received in corresponding passageways respectively and categorized with first terminals and second terminals, two adjacent first terminals being paired to be a pair of differential terminals and the second terminals being non-differential terminals, each of the row of terminals comprising a retaining portion, an elastic portion extending forward and a leg portion extending rearward from the elastic portion; and a plurality of insulators retained in the insulating housing;

wherein the first terminal and the second terminal are similarly shaped, each pair of differential terminals is retained in the insulator, and each of the second terminals is directly retained in the passageway.

2. The card edge connector as claimed in claim 1, wherein each pair of differential terminals is embedded in the insulator by insert molding.

3. The card edge connector as claimed in claim 1, wherein the retaining portions of each pair of differential terminals are embedded in the insulator, the elastic portions are located in front of the insulator, and the leg portions are located behind the insulator.

4. The card edge connector as claimed in claim 3, wherein rear parts of passageways receiving the pair of differential terminals open with each other to define a receiving space, and the insulator is received in the receiving space.

5. The card edge connector as claimed in claim 1, wherein the insulator defines an opening slot located between the two differential terminals of each pair.

6. The card edge connector as claimed in claim 5, wherein the insulator protrudes forward beyond an inner bottom face of the card slot and defines a step face abutting forward.

7. The card edge connector as claimed in claim 5, wherein the retaining portion defines barbs at opposite sides thereof, and the barbs on one side are exposed to the opening slot.

8. A card edge connector comprising:

an insulating housing comprising two opposite side walls, a card slot defined between the two side walls and opening forward, and a plurality of passageways on the side wall;

a row of terminals received in corresponding passageways respectively and categorized with first terminals and second terminals, two adjacent first terminals being paired to transmit differential signal and the second terminals adapted to transmit non-differential signal, each of the row of terminals comprising a retaining portion with barbs on opposite sides thereof, an elastic portion with a contacting portion projecting into the card slot, and a leg portion extending out of the housing; and a plurality of insulators retained in the insulating housing, each insulator being loaded with one pair of first terminals;

wherein in each pair of first terminals, the retaining portions with the barbs are retained in the insulator and the elastic portions extend beyond the insulator and go across corresponding passageways, while in each second terminal, the retaining portion with the barbs is directly retained in corresponding passageway.

9. The card edge connector as claimed in claim 8, wherein the insulator defines an opening slot through a front face and an inner face thereof, the elastic portion extends from the front face of the insulator, and the inner face is proximate to the card slot.

10. The card edge connector as claimed in claim 9, wherein the insulator further has a through hole opening through the inner face and an outer face opposite to the inner face.

11. The card edge connector as claimed in claim 8, wherein the barbs on one side of the retaining portion are at least partially exposed to the opening slot.

* * * * *